United States Patent [19]

Jaworski et al.

[11] 4,126,710

[45] Nov. 21, 1978

[54] PROCESS FOR PREPARING SAUCE MIXES

[75] Inventors: Raymond A. Jaworski, Norwalk; Mark G. Paulson, Westport, both of Conn.

[73] Assignee: Standard Brands Incorporated, New York, N.Y.

[21] Appl. No.: 810,134

[22] Filed: Jun. 27, 1977

[51] Int. Cl.² .............................................. A23L 1/195
[52] U.S. Cl. ..................................... 426/589; 426/652
[58] Field of Search ................. 426/589, 652, 578, 98, 426/99, 103

[56] References Cited

U.S. PATENT DOCUMENTS

| 2,131,064 | 9/1938 | Musher | 426/589 |
|---|---|---|---|
| 2,168,360 | 8/1939 | Musher | 426/589 |
| 2,811,452 | 10/1957 | Lesparre | 426/589 |
| 3,245,805 | 4/1966 | O'Neill | 426/589 |
| 3,300,319 | 1/1967 | Marotta | 426/589 |
| 3,469,991 | 9/1969 | Hawley | 426/589 |
| 3,652,299 | 3/1972 | Penton | 426/589 |
| 3,966,993 | 6/1976 | Luck | 426/589 |

*Primary Examiner*—Jeanette M. Hunter

[57] ABSTRACT

Particulate farinaceous material having moisture present therein and hot liquid fat are combined to provide a thick particulate mixture which is maintained at sufficient temperature to evaporate a substantial portion of said moisture and to thoroughly coat the particles with liquid fat. The heated mixture, which has a dough-like consistency, reverts to a liquefied state upon being cooled to within a specified temperature range. When the liquefied mixture is further cooled, a plastic mass is obtained wherein the farinaceous particles and crystallized fat glycerides are interspersed.

14 Claims, No Drawings

PROCESS FOR PREPARING SAUCE MIXES

BACKGROUND OF THE INVENTION

1. Field of the Invention

The invention relates to a process for preparing sauce mixes which are plastic at ambient temperatures.

2. Description of the Prior Art

There are a number of patents directed to food concentrates or sauce mixes and processes for preparing the same. U.S. Pat. No. 2,131,064 to Musher relates to a food base comprising a water absorbent bodier and a hard fat. The bodier is incorporated into an aqueous material which is then combined with a hard fat to provide a solid, plastic product. U.S. Pat. No. 2,168,360, also to Musher, discloses a concentrated food product comprising a hard fat and a water absorbent bodier which may be used to prepare an emulsion by combining the product with an aqueous liquid. The concentrate is prepared by combining the ingredients thereof with agitation until the fat congeals to allow formation of a shapable product. U.S. Pat. No. 2,811,452 to Lesparre et al. relates to a white sauce base which is dispersible in water comprising flour, powdered skimmed milk and animal fat. The dry ingredients are blended and then combined with the heated fat to provide a paste. U.S. Pat. No. 3,245,805 to O'Neill et al. relates to a sauce mix for casseroles comprising a coloring agent, a fat-emulsifier mixture, flour and flavoring ingredients. The fat-emulsifier mixture is solidified by holding the same at low temperatures and then the solidified mixture is combined with the remaining ingredients.

U.S. Pat. No. 3,300,319 to Marotta et al. relates to a solid sauce base comprising an edible lipid admixed with a starch conversion product having certain critical viscosity characteristics to provide a mixture having a dough-like consistency. U.S. Pat. No. 3,469,991 to Hawley relates to a product having a paste-like consistency comprising a mixture of oil and soy protein and wherein oil has been introduced into the protein particles. The oil and soy protein are placed in an attrition mill to produce a free flowing composition which sets up into a paste when the composition is cooled to room temperature. U.S. Pat. No. 3,652,299 to Penton relates to a process for making brittle sauce concentrates comprising solid fat, starch material and flavoring. The concentrate is prepared by adding the starch material and flavoring to the melted fat and cooling the mixtue which may then be cast into selected shapes. U.S. Pat. No. 3,966,993 to Luck relates to a process for making a solid sauce bar. Triglyceride fat having certain specified characteristics is melted and flour and condiments are admixed therewith. The mixture is tempered by cooling with agitation to allow the formation of fat crystals following which the mixture is warmed to render it pourable. The mixture is then shaped and allowed to harden under refrigeration.

A number of food concentrates or sauce mixes are commercially available as dry compositions which are prepared for use by admixing the same with liquid and heating. Such concentrates or mixes are usually made by preparing aqueous mixtures or suspensions of suitable ingredients and then removing all or most of the aqueous material by evaporative procedures such as heating, freeze drying, etc. These methods are expensive in terms of capital investment for large scale equipment and energy expenditures. Furthermore, although such products have met with some degree of success in the marketplace, there are a number of disadvantages associated with their use. In general, dry mixes must be packaged in individual, hermetically sealed containers in order to prevent contact of the mixes with air. Such packaging requirements, of course, add unduly to the cost of the products. Concentrates having a reduced liquid content are also available but have the disadvantage of requiring expensive leak-proof containers. Moreover, their distribution involves the costly transporting of liquids which is preferably avoided for economic reasons.

Because fat is known to provide improved flavor, consistency and mouth feel to foods, its use in certain food applications is highly desirable. For obvious reasons, concentrates containing a substantial proportion of fat are generally not prepared in dry form. Advantageously, such concentrates are provided in print or tub configurations or the like, similar to margarines, for example. Although fat-containing concentrates in these forms provide a number of benefits in terms of convenience, stability, etc., their preparation generally involves expensive equipment and procedures.

Heated mixtures of flour and fat used as thickeners in gravies and as sauce bases and the like are known as roux. Flour and fat are combined in suitable proportions and amounts and heated for varying periods depending upon the type of roux desired. Preparation of conventional roux is time-consuming and considerable care must be taken to avoid overheating and to achieve a smooth consistency.

OBJECTS OF THE INVENTION

It is the principal object of the present invention to provide a process for preparing sauce mixes.

It is another object of the present invention to provide sauce mixes which may simply be combined with liquids to obtain satisfactory products.

These and other objects will be apparent from the following specification and claims.

SUMMARY OF THE INVENTION

A sauce mix is prepared by forming a thick mixture comprising particulate farinaceous material having present moisture and hot liquid fat and maintaining the mixture at a temperature sufficient to evaporate a substantial portion of the moisture and coat the particles with liquid fat. The resulting dough-like mixture is then cooled to within a temperature range at which it reverts to a liquefied state and further cooled to form a plastic mass wherein the farinaceous particles and crystallized fat glycerides are interspersed.

DETAILED DESCRIPTION OF THE INVENTION

The rheological characteristics of food materials are of considerable importance in commercial processes, particularly in respect to their ease of handling. Thick particulate mixtures, e.g., those having a dough-like consistency, can present processing problems due to their lack of flowability.

We have surprisingly found that when a thick mixture comprising fat and particulate farinaceous material is processed under certain conditions, flowability can be imparted thereto and the mixture can be handled with relative ease.

For purposes of the present invention, it will be understood that in this description and in the claims, fat is defined as being in liquid or solid form at ambient temperatures. Also, the term farinaceous material is defined by common usage as particulate cereal-derived material which is rich in starch and contains varying amounts of protein but excluding starches as such.

The sauce mix of the present invention is preferably provided in print or bar form similar to margarine, for example, but having a lower water content. Depending upon the solids concentration of the finished product, the sauce mix will retain its desired shape and will also be substantially bacteriostatic.

In the first step of the present process a fat, preferably a vegetable oil, is heated to a temperature in the range of from about 80° to about 107° C. and then the particulate farinaceous material is added thereto. The amount of farinaceous material utilized may vary over a relatively wide range such as from about 30 to about 50 percent and preferably from about 35 to about 45 percent.

During the addition of the farinaceous material, the temperature of the mixture will decrease somewhat and additional heat energy is required to completely disperse the particles and to make certain that the particles are coated with the liquid fat. Preferably, the mixture will be maintained at a temperature of from about 77° to about 100° C. and most preferably at a temperature of about 88° C. During this heating period and agitation of the mixture, moisture inherently present in the farinaceous material will be driven off until the mixture contains from about 1 to about 6.5 percent moisture and preferably about 3.5 percent moisture. This mixture can be characterized as particulate in texture and resembling a dough in consistency.

Next, the mixture of fat and farinaceous material is cooled under controlled conditions to a first temperature range, preferably of from about 90° to about 68° C., within which the mixture reverts to a liquefied state and may be poured or pumped with relative ease. This phenomenon, i.e., the unexpected change in the consistency of the mixture, is extremely important in the processing of the sauce mix since, when it is in a liquefied state, the mixture can be pumped or otherwise handled under conditions normally employed to transfer liquid materials. Thus, for example, the mixture may be transferred from a mixing kettle to a heat exchange means where it may be further cooled to a plastic consistency and extruded or otherwise handled by conventional food processing means.

Although we do not wish to be bound to any theory to explain this phenomenon, it may be that when the mixture is first heated, there occurs the formation of the interparticle forces or bonds between the farinaceous materials and the oil and, upon cooling, the farinaceous particles contract thereby weakening or breaking the interparticle forces. Another theory suggests that when the particulate material is heated, the helical configuration of the gluten contained therein is stretched or elongated and, while in this configuration, is somehow susceptible to reacting with oil within a particular temperature range to provide a liquefied consistency to the mixture.

Finally, the liquefied mixture is further cooled to a second temperature of below about 7° C. at which point stable fat glyceride crystals are formed and a plastic mass results wherein the farinaceous particles are distributed throughout the crystallized fat.

In compounding the sauce mix, the principal farinaceous material utilized will be cereal flour having a gluten content of from about 5 to about 20 percent. The preferred flour is wheat flour. Although the amount of farinaceous material may vary over a relatively wide range, sufficient thereof must be incorporated into the mixture to provide satisfactory body and other desired functional and organoleptic characteristics to the finished products.

In addition to the farinaceous material, a small proportion of starch, for example, from about 2 to about 10 percent, may also be present. The preferred starch is corn starch. This small amount of starch, which apparently is not fully gelatinized due to lack of water, provides additional body to the mix and imparts a sheen to the surface of the finished product.

It is desirable to incorporate a small amount of a hard fat, e.g., stearine, into the mix, particularly if the product is to be exposed to relatively high ambient temperatures, to impart structural stability to the shaped product. Typically, from about 1 to about 10 percent of the hard fat will be incorporated. Depending on the nature of the final product desired, additional materials such as flavoring, condiments, nutrients, sweeteners, etc. may also be incorporated.

Although final cooling of the mix may be affected by any suitable means known in the art, advantageously, due to its flowability characteristics, the mixture may be quick chilled by pumping it through a heat transfer means, such as a scraped surface heat exchange apparatus to affect rapid crystallization of fat glycerides. The cooled mixture assumes a plastic configuration at normal room temperature and may be formed into any desired shape such as bars, blocks, flakes, rods, etc. or solidified in individual tubs or similar containers. Cooling the flowable mixture by pumping it through a heat transfer apparatus provides the advantage over certain prior art processes of continuous processing with attendant economies in efficiency and energy expenditures.

In order to more clearly describe the nature of the present invention, specific examples will hereinafter be described. It should be understood, however, that this is done solely by way of example and is intended neither to delineate the scope of the invention nor limit the ambit of the appended claims. In the examples and throughout the specification, percentages refer to percent by weight and are based on the weight of the final product unless otherwise specified.

EXAMPLE I

This Example illustrates the present process for preparing a sauce mix.

A mixture comprising 38.64 g of wheat flour having a gluten content of 14 percent and 37.14 g of a hydrogenated mixture of 90 percent soy and 10 percent cottonseed oils was heated in a jacketed kettle to a temperature of about 105° C. with stirring for a period of about 10 minutes. 4.52 g of corn starch, 1.55 g of stearine and suitable amounts of salt, flavorings, colorants and spices were incorporated into the mixture with stirring while it was maintained at a temperature of about 88° C. until all ingredients were thoroughly blended. The mixture was then cooled to a temperature of about 72° C. at which point the viscosity of the mixture was such that it was flowable and could be pumped by conventional means.

The mixture was then pumped through a Votator scraped surface heat exchanger. The temperature of the mixture entering the Votator was about 71° C. and the exiting temperature was about 4° to 5° C. The mixture was collected in a container and maintained therein at a temperature of 40° C. until crystallization had proceeded sufficiently to allow the mixture to become plastic following which the mixture was extruded into bar form.

EXAMPLE II

This Example illustrates the process for preparing a sauce mix having a chicken flavor.

A concentrate was prepared as shown in Example I except that half of the fat mixture was replaced with chicken fat and the amount of stearine was increased to about 7.5 g.

EXAMPLE III

This Example illustrates the process for preparing a sauce mix suitable for preparing a white sauce.

A concentrate was prepared as shown in Example I except that 2.3 g of non-fat dried milk was incorporated into the mixture.

A typical sauce mix of the present invention was formulated and the viscosity thereof determined during cooling.

The results of the viscosity measurements are shown in Table I:

TABLE I

Viscosity Measurements of Sauce Mix Formulation During Cooling

| Temperature of Mixture (° C) | Viscosity* (Centipoise) | Observations |
|---|---|---|
| 96 | 13,627 | particulate mixture having a dough-like consistency |
| 84 | 12,746 | |
| 80 | 11,786 | |
| 72 | 9,040 | liquid and therefore pumpable |
| 67 | 8,256 | |
| 56 | 8,746 | |
| 52 | 9,013 | |
| 42 | 15,680 | plastic mass |
| 38 | 32,853 | |

*average of 3 to 6 determinations

EXAMPLE IV

This Example illustrates the process for preparing a sauce mix suitable for preparing a chili sauce.

A concentrate was prepared as shown in Example I except that 1.2 g of chili flavoring and suitable amounts of pepper and other spices were incorporated into the mixture to provide the characteristic flavor of chili.

The terms and expressions which have been employed are used as terms of description and not of limitation, and it is not intended in the use of such terms and expressions to exclude any equivalents of the features shown and described or portions thereof, since it is recognized that various modifications are possible within the scope of the invention claimed.

What is claimed is:

1. A process for preparing a sauce mix comprising forming a mixture by heating fat to an elevated temperature range and adding thereto a particulate moisture-containing farinaceous material, maintaining the mixture substantially within said elevated temperature range for a time sufficient to evaporate a substantial portion of said moisture and to obtain a thick particulate mixture having a dough-like consistency wherein the farinaceous particles are coated with the liquid fat, cooling the heated mixture to within a temperature range wherein the mixture reverts to a liquefied state and then further cooling the mixture to form a plastic mass wherein farinaceous particles and crystallized fat glycerides are interspersed.

2. A process for preparing a sauce mix as defined in claim 1, wherein the temperature of the liquid fat prior to the addition of the farinaceous material is from about 80° to about 107° C.

3. A process for preparing a sauce mix as defined in claim 2, wherein the temperature of the mixture comprising liquid fat and farinaceous material is maintained at from about 77° to about 100° C. prior to cooling the same.

4. A process for preparing a sauce mix as defined in claim 3, wherein the temperature of the mixture comprising liquid fat and farinaceous material is maintained at about 88° C.

5. A process for preparing a sauce mix as defined in claim 1, wherein the heated mixture is first cooled to within a temperature range of from below about 90° to about 68° and then cooled to a temperature below about 7° C.

6. A process for preparing a sauce mix as defined in claim 2, wherein the amount of farinaceous material is from about 30 to about 50 percent.

7. A process for preparing a sauce mix as defined in claim 6, wherein the amount of farinaceous material is about 35 to about 45 percent.

8. A process for preparing a sauce mix as defined in claim 7, wherein the farinaceous material comprises wheat flour.

9. A process for preparing a sauce mix as defined in claim 8, wherein the major portion of the farinaceous material has a gluten content of from about 5 to about 20 percent.

10. A process for preparing a sauce mix as defined in claim 9, wherein the amount of moisture remaining in the farinaceous material after heating the mixture is from about 1 to about 6.5 percent.

11. A process for preparing a sauce mix as defined in claim 10, wherein the amount of moisture remaining in the farinaceous material after heating the mixture is about 3.5 percent.

12. A process for preparing a sauce mix as defined in claim 9, wherein from about 2 to about 10 percent starch is incorporated into the sauce mix.

13. A process for preparing a sauce mix as defined in claim 1 comprising:
   1. forming a mixture by heating fat to an elevated temperature range, adding thereto from about 30 to about 50 percent particulate moisture-containing farinaceous material having a gluten content of from about 5 to about 20 percent, from about 2 to about 10 percent hard fat, flavorings and, condiments;
   2. maintaining the mixture substantially within said elevated temperature range for a time sufficient to achieve a moisture level in said mixture of from about 1 to about 6.5 percent without fully gelatinizing the starch and to obtain a thick particulate mixture having a dough-like consistency wherein the farinaceous particles are coated with the fat;
   3. cooling the heated mixture to within a temperature range wherein the mixture reverts to a liquefied state and then further cooling the mixture to form a dimensionally stable, plastic mass having a surface sheen and wherein farinaceous particles and crystallized fat glycerides are interspersed.

14. A sauce mix prepared according to the process of claim 13.

* * * * *

UNITED STATES PATENT OFFICE
CERTIFICATE OF CORRECTION

PATENT NO. : 4,126,710

DATED : November 21, 1978

INVENTOR(S) : Raymond A. Jaworski and Mark G. Paulson

It is certified that error appears in the above-identified patent and that said Letters Patent are hereby corrected as shown below:

Column 1, line 48; "mixtue" should read --mixture--.

UNITED STATES PATENT OFFICE
CERTIFICATE OF CORRECTION

PATENT NO. : 4,126,710            Page 2 of 2

DATED : November 21, 1978

INVENTOR(S) : Raymond A. Jaworski and Mark G. Paulson

It is certified that error appears in the above-identified patent and that said Letters Patent are hereby corrected as shown below:

Table I, Column 5 should appear as follows:

TABLE I

Viscosity Measurements of Sauce Mix Formulation During Cooling

| Temperature of Mixture (°C) | Viscosity* (Centipoise) | Observations |
|---|---|---|
| 96 | 13,627) | particulate mix- |
| 84 | 12,746) | ture having a |
| 80 | 11,786) | dough-like con- sistency |
|  |  |  |
| 72 | 9,040) | liquid and there- |
| 67 | 8,256) | fore pumpable |
| 56 | 8,746) |  |
| 52 | 9,013) |  |
|  |  |  |
| 42 | 15,680) | plastic mass |
| 38 | 32,853) |  |

*average of 3 to 6 determinations

Signed and Sealed this

Third Day of April 1979

[SEAL]

Attest:

RUTH C. MASON
Attesting Officer

DONALD W. BANNER
Commissioner of Patents and Trademarks